United States Patent [19]

Reeves

[11] Patent Number: 5,409,081
[45] Date of Patent: Apr. 25, 1995

[54] MOBILE HUNTING APPARATUS

[76] Inventor: Johnny F. Reeves, 27103 F. M. 2978, Magnolia, Tex. 77355

[21] Appl. No.: 100,603

[22] Filed: Jul. 30, 1993

[51] Int. Cl.⁶ ............................................. E06C 5/00
[52] U.S. Cl. ..................................... 182/63; 182/68; 182/116
[58] Field of Search ................. 182/63, 68, 116, 127, 182/18

[56] References Cited

U.S. PATENT DOCUMENTS

| | | | |
|---|---|---|---|
| 4,442,919 | 4/1984 | Fulcher | 182/63 |
| 4,614,252 | 9/1986 | Tarner | 182/116 |
| 4,800,986 | 1/1989 | Hayes, III | 182/116 |
| 5,295,555 | 5/1994 | Strange | 182/63 |

Primary Examiner—Mitchell J. Hill
Attorney, Agent, or Firm—J. M. Gilbreth

[57] ABSTRACT

Disclosed is a mobile elevated hunting apparatus from which a hunter can hunt. The apparatus includes a hunting stand having a seat for holding the hunter in a seated position, framing around the seat and one or more legs attached to the seat for elevating the seat above the ground. The apparatus further includes a motorized vehicle for supporting and transporting the hunting stand. Finally, the apparatus includes a pivot bracket connecting the hunting stand with the motorized vehicle, suitable for positioning the hunting stand in a first transporting position fully on the vehicle and for positioning the hunting stand in a second hunting position with the hunting stand legs on the ground.

11 Claims, 3 Drawing Sheets

MOBILE HUNTING APPARATUS

BACKGROUND OF THE INVENTION

1. Field of the Invention

The present invention relates to an apparatus for hunting. In another aspect, the present invention relates to a mobile apparatus for hunting. In still another aspect, the present invention relates to a mobile hunting stand comprising a hunting stand mounted on an all terrain vehicle.

2. Description of the Related Art

Hunting is a sport that literally may lead a hunter off of the beaten path. In fact, when hunting trophy animals such as whitetail deer, a hunter will generally venture into remote backwoods areas in search of deer. This will generally require that the hunter leave paved, gravel and even dirt roads and travel on narrow dirt paths or across country.

Hunting is many times conducted from a stand that may be elevated on its own legs or built above ground in a tree. Typically, a deer hunter will carry materials across the countryside to build a deer stand. Once at the desired site, the hunter then proceeds to assemble the deer stand. After assembly, the hunter will then sit in the deer stand waiting for a deer to pass within rifle shot.

Carrying deer stand materials across rough terrain is obviously a drawback with the prior art deer stands. Assembly of the deer stand in remote country is an additional drawback. Finally, at the end of the day the hunter generally leaves the stand in the field upon returning home. This subjects the deer stand to the elements and to theft.

Thus, the art needs a hunting stand not requiring complicated assembly at the hunt site.

The art also needs a hunting stand that is easily transportable.

Finally, the art also needs a hunting stand that is easily disassembled at the hunt site.

These and other needs will become apparent to those of skill in the art by the following description of the invention.

Thus it is an object of the present invention to provide a hunting stand that is easily assembled at the hunt site.

It is another object of the present invention to provide a hunting stand that is easily transportable.

It is still another object of the present invention to provide a hunting stand that is easily disassembled at the hunt site.

These objects and other objects of the present invention will become more apparent to those of skill in the art by the following description of the invention.

SUMMARY OF THE INVENTION

According to one embodiment of the present invention there is provided a mobile elevated hunting apparatus from which a hunter can hunt. The apparatus includes a hunting stand comprising a seat for holding the hunter in a seated position, framing around the seat and one or more legs attached to the seat for elevating the seat above the ground. The apparatus additionally includes a motorized vehicle, such as an all terrain vehicle, for supporting and transporting the hunting stand. Finally, the apparatus includes a pivot bracket means connecting the hunting stand with the motorized vehicle, suitable for positioning the hunting stand in a first position fully on the vehicle and for positioning the hunting stand in a second position with the hunting stand legs on the ground.

According to another embodiment of the present invention there is provided a hunting apparatus from which a hunter can hunt. The apparatus includes a hunting stand comprising a sitting means for holding the hunter in a seated position, framing around the seat and one or more legs attached to the seat for elevating the seat above the ground. The apparatus further includes a pivot bracket means for connecting the hunting stand with a motorized vehicle and suitable for positioning the hunting stand in a first position fully on the vehicle and for positioning the hunting stand in a second position with the hunting stand legs on the ground.

DETAILED DESCRIPTION OF THE INVENTION

Figure 1:
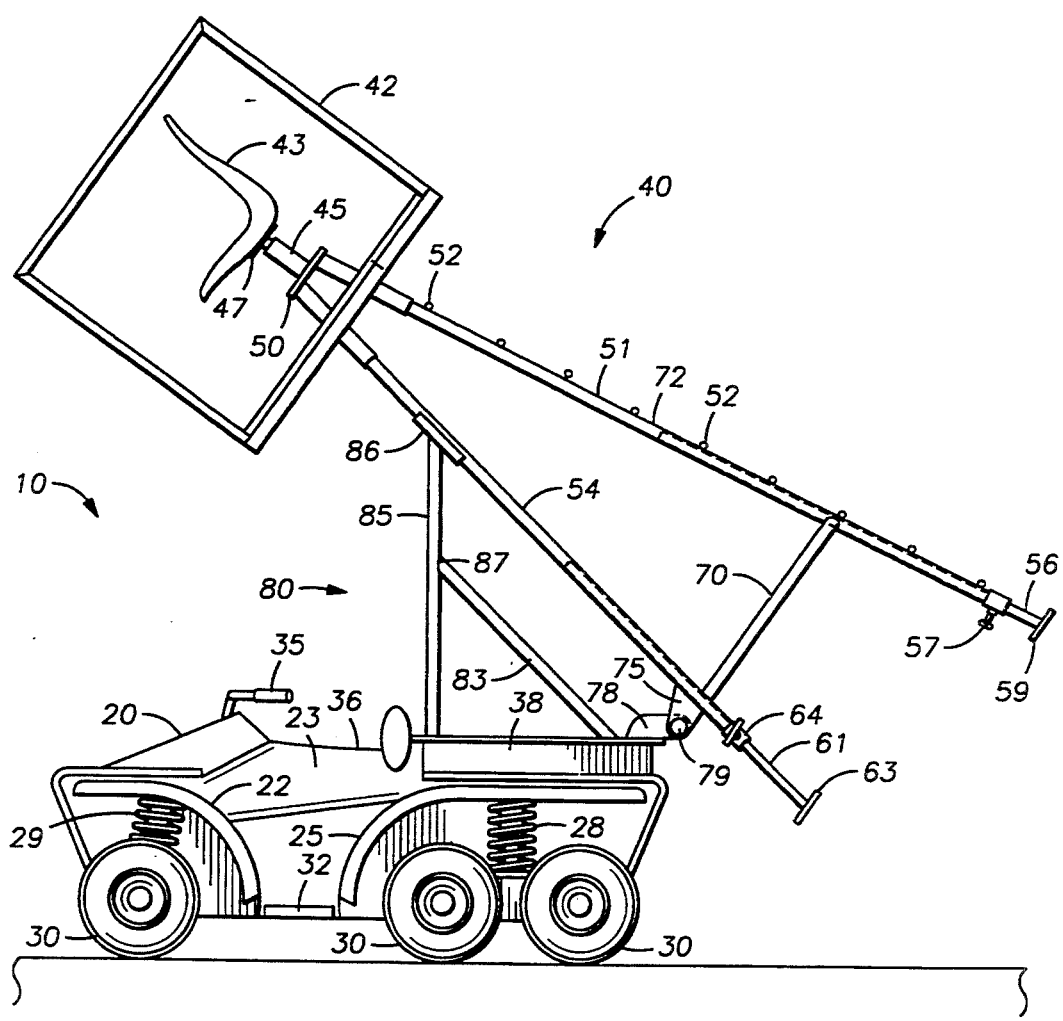
FIG. 1 illustrates a side view of apparatus 10 of the present invention showing vehicle 20 with hunting stand 40 in the travelling position on mounting frame 80.

Referring now to FIG. 1 there is shown a side view of apparatus 10 of the present invention showing vehicle 20, mounting frame 80 and hunting stand 40. As shown, hunting stand 40 is in the travelling position.

In the present invention, vehicle 20 may be any type of vehicle suitable for use in hunting including, but not limited to, for example, trucks, tractors, trailers, and three and four wheel all-terrain vehicles. In the embodiment shown, vehicle 20 is a four wheel all-terrain vehicle.

In the embodiment shown, four wheel all-terrain vehicle 20 includes chassis 23, seat 36, handle bars 35, foot rests 32 and bed 38. Vehicle 20 further includes wheel fenders 22 and 25, wheels 30 and shock absorbers 28 and 29.

Hunting stand 40 of the present invention includes hunting stand legs 51 and 54 which support hunting seat 43 that is within hunting cage 42. Hunting stand legs 51 and 54 may generally be constructed of any material suitable to support hunting seat 43, hunting cage 43 and a hunter. Hunting stand legs 51 and 54 may generally be constructed of any material suitable to support a hunter and withstand the rigors of transporting and hunting. In the embodiment of the present invention shown, hunting stand legs 51 and 54 are comprised of steel.

At their upper ends, hunting stand legs 51 and 54 are connected to mounting plate 50. Additionally, near their upper ends, hunting stand legs 51 and 54 are also connected to hunting cage 43.

In the apparatus of the present invention, hunting seat 43 includes hunting seat mounting plate 47. Generally, hunting seat 43 may be comprised of any suitable material including metal or plastic. Mounting post 45 is connected to both mounting plate 50 and hunting seat mounting plate 47. To allow the hunter a full range of vision, hunting seat 43 will generally be mounted to swivel.

Hunting stand leg 51 includes base 59, hunting stand leg extension 56 and extension leg locking pin 57. Hunting stand leg 51 is generally hollow to receive hunting stand leg extension 56 which is held in place by locking pin 57.

In the embodiment shown, hunting stand legs 54 each includes a hunting stand base 63, hunting stand leg extension 61 and extension leg locking pin 64. Hunting stand legs 54 are also generally hollow and each suitable to receive a hunting stand leg extension 61 each of which are held in place by their own locking pin 64.

In the embodiment shown, hunting stand 40 comprises three hunting stand legs. Fewer or greater number of hunting stand legs can be utilized provided of course the hunting stand can be properly balance to support a hunter. For example, if one or two legs are utilized, then hunting stand 40 will be supported and balanced by vehicle 20. With three or more legs, it is believed that hunting stand 40 can be self-supported apart from vehicle 40.

Hunting stand lateral supports 70 are attached across hunting stand legs 51 and 54 as shown and provide lateral stability to the apparatus of the present invention. Hunting stand lateral supports 70 are generally constructed of any material suitable to provide lateral support to hunting stand 40 and withstand the rigors of transporting and hunting. In the embodiment shown, lateral supports 70 are comprised of steel.

In the present invention, mounting frame 80 serves to support hunting stand 40 on vehicle 20 during transportation. Mounting frame 80 comprises vertical support poles 85, mounting brackets 86 and mounting frame lateral support 83. Mounting frame 80 further includes vehicle mounting plate 78, hunting stand mounting plate 75 and pivot joint 79. Pivot 79 will generally comprise a pin inserted through passages in the ends of vehicle mounting plate 78 and hunting stand mounting plate 75.

In the travelling position, hunting stand 40 is attached at its upper end to all terrain vehicle 20 via mounting brackets 86 and vertical support poles 85. Brackets 86 are generally suitable to receive hunting stand legs 54. Optionally, brackets 86 may additionally include clamping, locking, holding, engaging or other such to secure hunting stand legs 54 during travel.

At its lower end, hunting stand 40 is attached to vehicle 20 via vehicle mounting plate 78, hunting stand mounting plate 75 and pivot joint 79.

Figure 2:
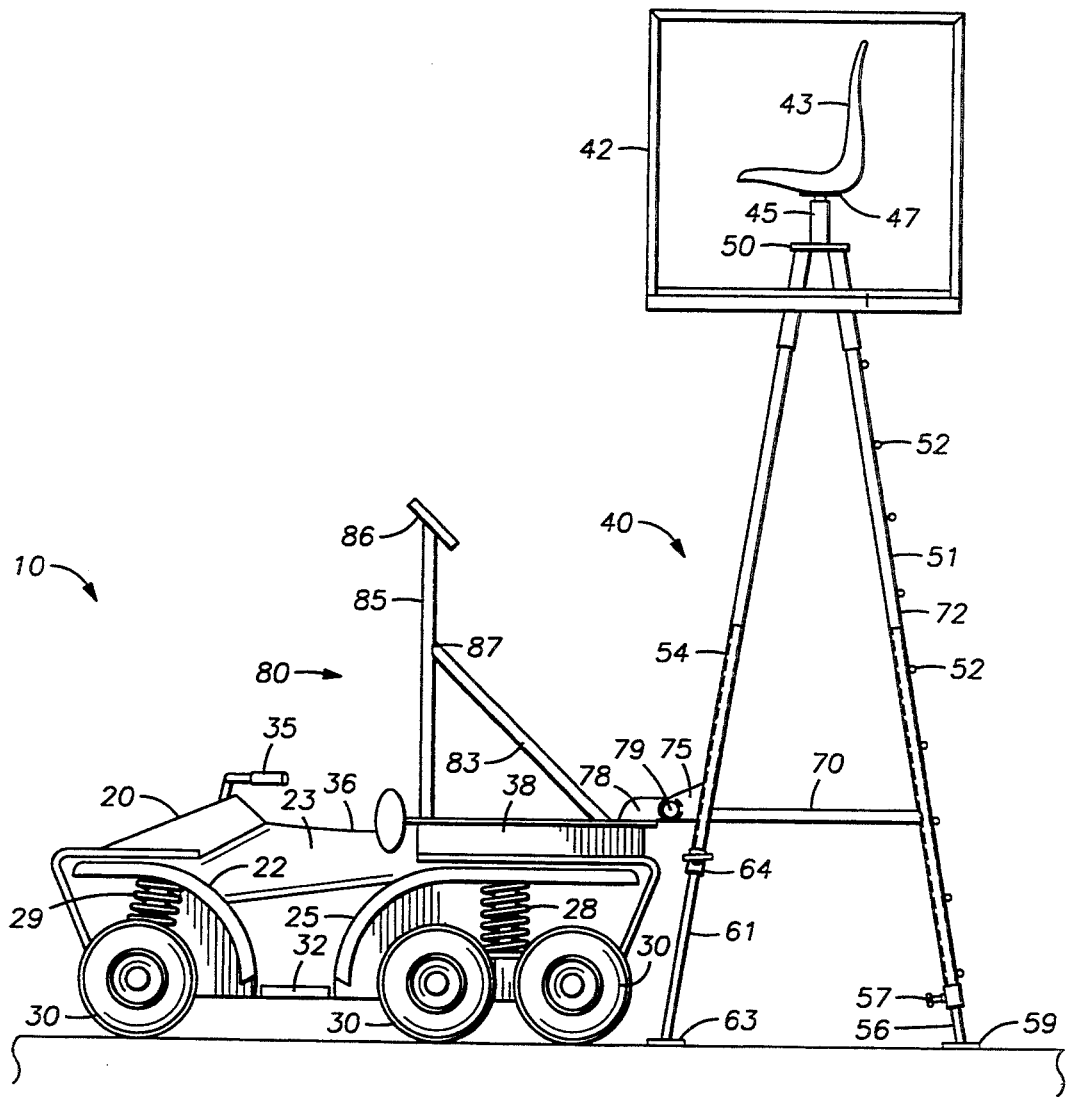
FIG. 2 illustrates a side view of apparatus 10 of the present invention showing vehicle 20 with hunting stand 40 in the hunting position.

Referring now to FIG. 2 there is shown a side view of apparatus 10 of the present invention showing vehicle 20 with hunting stand 40. As shown, hunting stand 40 is in the hunting position, having been rotated from the travelling position shown in FIG. 1.

As in FIG. 1, four wheel all-terrain vehicle 20 includes chassis 23, seat 36, handle bars 35, foot rests 32 and bed 38. Vehicle 20 further includes wheel fenders 22 and 25, wheels 30 and shock absorbers 28 and 29.

As shown, hunting stand 40 is now in the upright or hunting position, with hunting stand leg base 59 and hunting stand leg bases 63 all planted firmly on the ground. Hunting stand 40 is rotated from the travelling position shown in FIG. 1 to the hunting position shown in FIG. 2, by first releasing locking pins 64 and 61 and adjusting leg extensions 61 and 56 to a suitable length. Next, hunting stand legs 54 are released from brackets 86 and hunting stand 40 then pivoted into position.

Optionally, hunting stand 40 may be easily released from all terrain vehicle 20 at pivot 79. As explained above, pivot 79 will generally comprise a pin inserted through passages in the ends of vehicle mounting plate 78 and hunting stand mounting plate 75. Removing the pin at pivot 79 will free hunting stand 40 from vehicle 40.

Once set up, the apparatus of the present invention may further include camouflage means to shield the hunter from view while the hunter waits for prey. Such means may include paneling, fabric, canvas or other material supported around hunting seat 43 by hunting cage 42.

Figure 3:
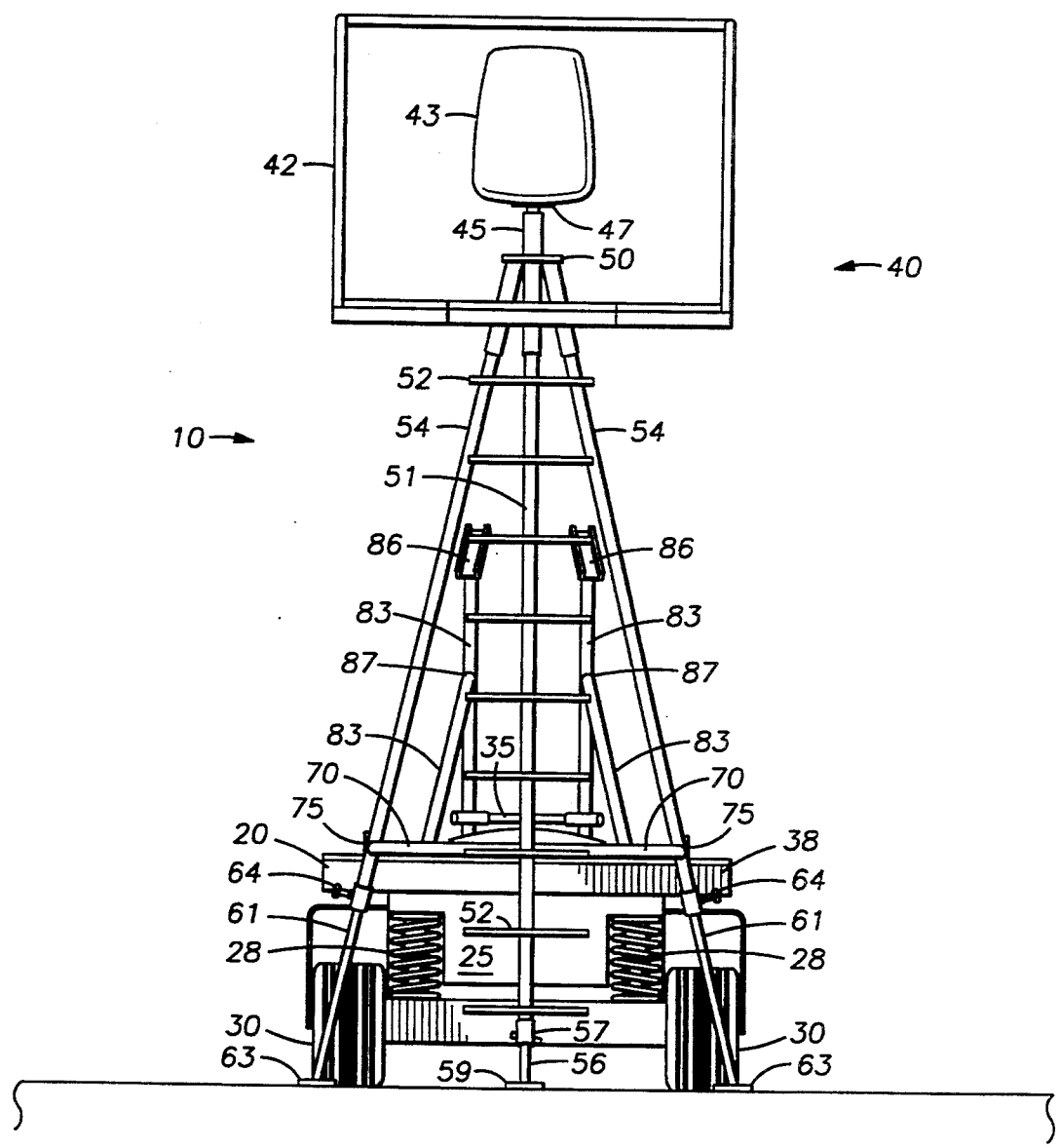
FIG. 3 illustrates a rear view of apparatus 10 of the present invention showing vehicle 20 with hunting stand 40 in the hunting position and further showing ladder 72.

Referring now to FIG. 3 there is illustrated a rear view of apparatus 10 of the present invention of FIG. 2, showing vehicle 20 with hunting stand 40 in the hunting position and further showing ladder 72.

In the operation of the present invention, the hunter is able to transport hunting stand 40 to a hunt cite by use of all terrain vehicle 80 as shown in FIG. 1.

Upon arrival at the desired hunt site, the hunter releases locking pins 64 and 57 and adjusts leg extensions 61 and 56 to a suitable length. Next, the hunter releases hunting stand legs 54 from brackets 86 and pivots hunting stand 40 into hunting position as shown in FIGS. 2 and 3.

The hunter then uses ladder 72 to gain access to hunting seat 43. As discussed above, camouflage may be placed around the hunter to shield or hide the hunter. Once in hunting seat 43 the hunter waits for prey to pass nearby.

At the end of the hunt, the hunter descends from hunting seat 43 via ladder 72.

To return home, or to relocate to another hunt site, the apparatus of the present invention may by easily placed in the travelling position for easy transport. First, the hunting stand 40 is pivoted at pivot 79 until hunting stand legs 54 engage brackets 86. After releasing locking pins 61 and 57, leg extensions 61 and 56 are then returned to their travelling position. Leg extensions 61 and 56 are then affixed in their desired travelling position with locking pins 64 and 57.

The description given herein is intended to illustrate the preferred embodiments of the present invention. It is possible for one of ordinary skill in the art to make various changes to the details of the present invention, including changes in the size, shape and materials, as well as in the details of the illustrated construction without departing from the spirit of this invention. Therefore, it is intended that all such variations be included within the scope of the present invention as claimed.

I claim:

1. A mobile elevated hunting apparatus from which a hunter can hunt, the apparatus comprising:
   (a) a hunting stand comprising a seat for holding the hunter in a seated position, framing around the seat and one or more legs attached to the seat for elevating the seat above the ground;
   (b) a motorized vehicle for supporting and transporting the hunting stand; and
   (c) a pivot bracket means connecting the hunting stand with the motorized vehicle, suitable for positioning the hunting stand in a first position fully on the vehicle and for positioning the hunting stand in a second position with the hunting stand legs on the ground, wherein the hunting stand is supported and balanced by hunting stand legs and the motorized vehicle.

2. The apparatus of claim 1 wherein the one or more legs comprise adjustable length sections.

3. The apparatus of claim 1 wherein the apparatus comprises three or more legs, and wherein the hunting stand can be self-supported on the three or more legs apart from the motorized vehicle.

4. The apparatus of claim 1 wherein the vehicle comprises an all terrain vehicle.

5. The apparatus of claim 1 wherein the vehicle further comprises holding means for securely holding the hunting stand on the vehicle while the hunting stand is in the first position.

6. The apparatus of claim 1 wherein the legs comprise adjustable length sections, the vehicle comprises an all terrain vehicle, and wherein the vehicle further comprises holding means for securely holding the hunting stand on the vehicle while the hunting stand is in the first position.

7. A hunting apparatus from which a hunter can hunt, the apparatus comprising:
(a) a hunting stand comprising a sitting means for holding the hunter in a seated position, framing around the seat and one or more legs attached to the seat for elevating the seat above the ground;
(b) a pivot bracket means for connecting the hunting stand with a motorized vehicle and suitable for positioning the hunting stand in a first position fully on the vehicle and for positioning the hunting stand in a second position with the hunting stand legs on the ground, wherein the hunting stand is supported and balanced by hunting stand legs and the motorized vehicle.

8. The apparatus of claim 7 wherein the one or more legs comprise adjustable length sections.

9. The apparatus of claim 7 wherein the apparatus comprises three or more legs, and wherein the hunting stand can be self-supported on the three or more legs apart from the motorized vehicle.

10. The apparatus of claim 7 wherein the apparatus further comprises holding means for securely holding the hunting stand on the vehicle while the hunting stand is in the first position.

11. The apparatus of claim 7 wherein the legs comprise adjustable length sections and wherein the apparatus further comprises holding means for securely holding the hunting stand on the vehicle while the hunting stand is in the first position.

* * * * *